United States Patent [19]

Miller et al.

[11] 4,110,798

[45] Aug. 29, 1978

[54] FREQUENCY RESPONSE EQUALIZER

[75] Inventors: Jerry W. Miller, Menlo Park; Luigi C. Gallo, Redwood City, both of Calif.

[73] Assignee: Ampex Corporation, Redwood City, Calif.

[21] Appl. No.: 762,902

[22] Filed: Jan. 26, 1977

[51] Int. Cl.² .............................................. G11B 5/45
[52] U.S. Cl. ..................................... 360/65; 325/473
[58] Field of Search .......................... 360/65; 325/473

[56]       References Cited
     U.S. PATENT DOCUMENTS

| 3,436,490 | 4/1969 | Roelofs | 360/65 |
| 3,831,192 | 8/1974 | Gross | 360/65 |
| 3,871,024 | 3/1975 | Camras | 360/65 |

OTHER PUBLICATIONS

IBM Technical Discl. Bull., #8, vol. 16, Jan. 1974, p. 2487.

*Primary Examiner*—Jay P. Lucas

[57] ABSTRACT

A frequency response equalizer includes a parallel combination of a low-pass integrating circuit and a high-pass differentiating circuit. Both circuits receive an input signal from a reproduce head followed by a preamplifier. Each circuit provides a 90° phase shift with respect to the input signal, equal in magnitude and opposite in sense. A subtraction circuit coupled to the respective outputs of both the integrating and differentiating circuit provides a difference signal of the respective output signals of both circuits. The resulting difference signal represents an amplitude and phase equalized signal.

8 Claims, 7 Drawing Figures

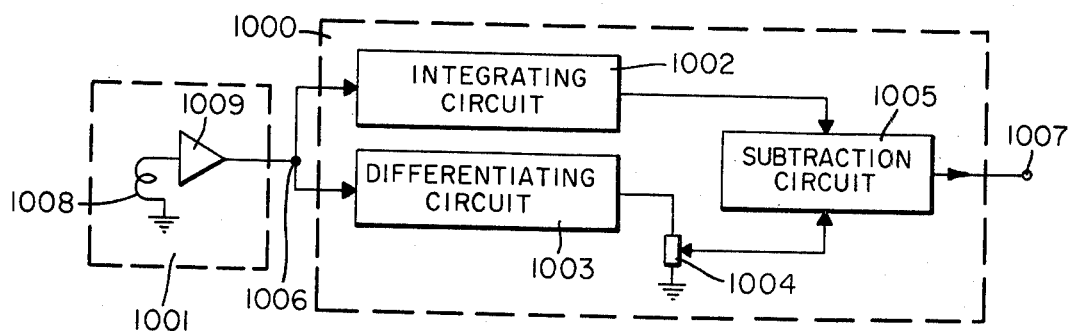
FIG_1
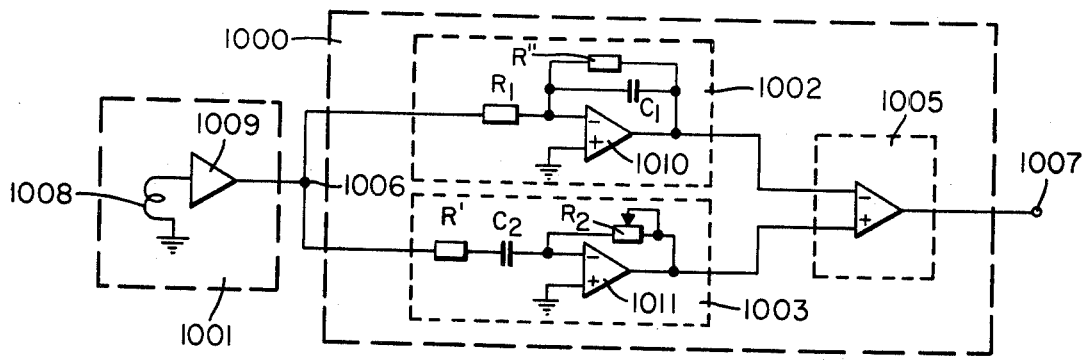
FIG_2
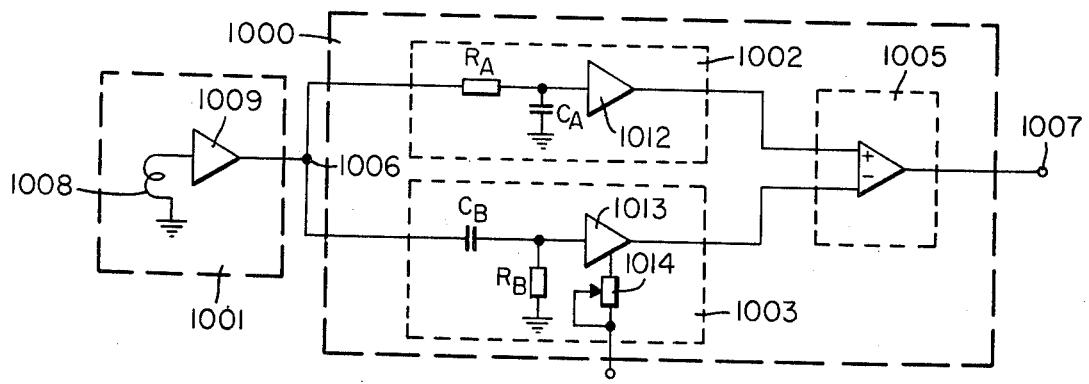
FIG_3
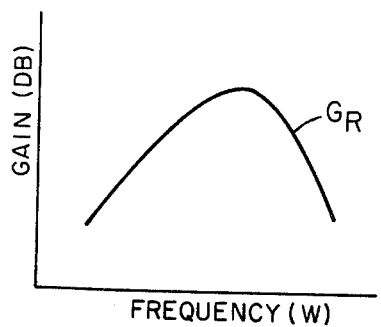
FIG_4
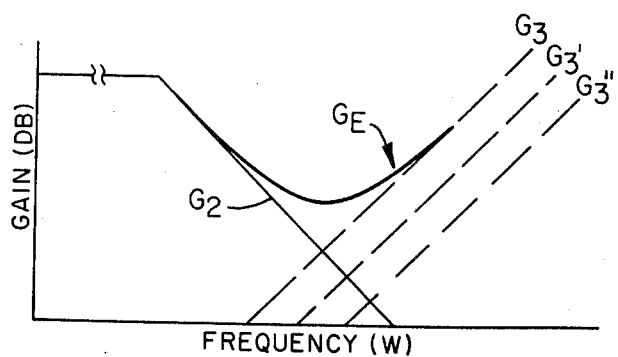
FIG_5

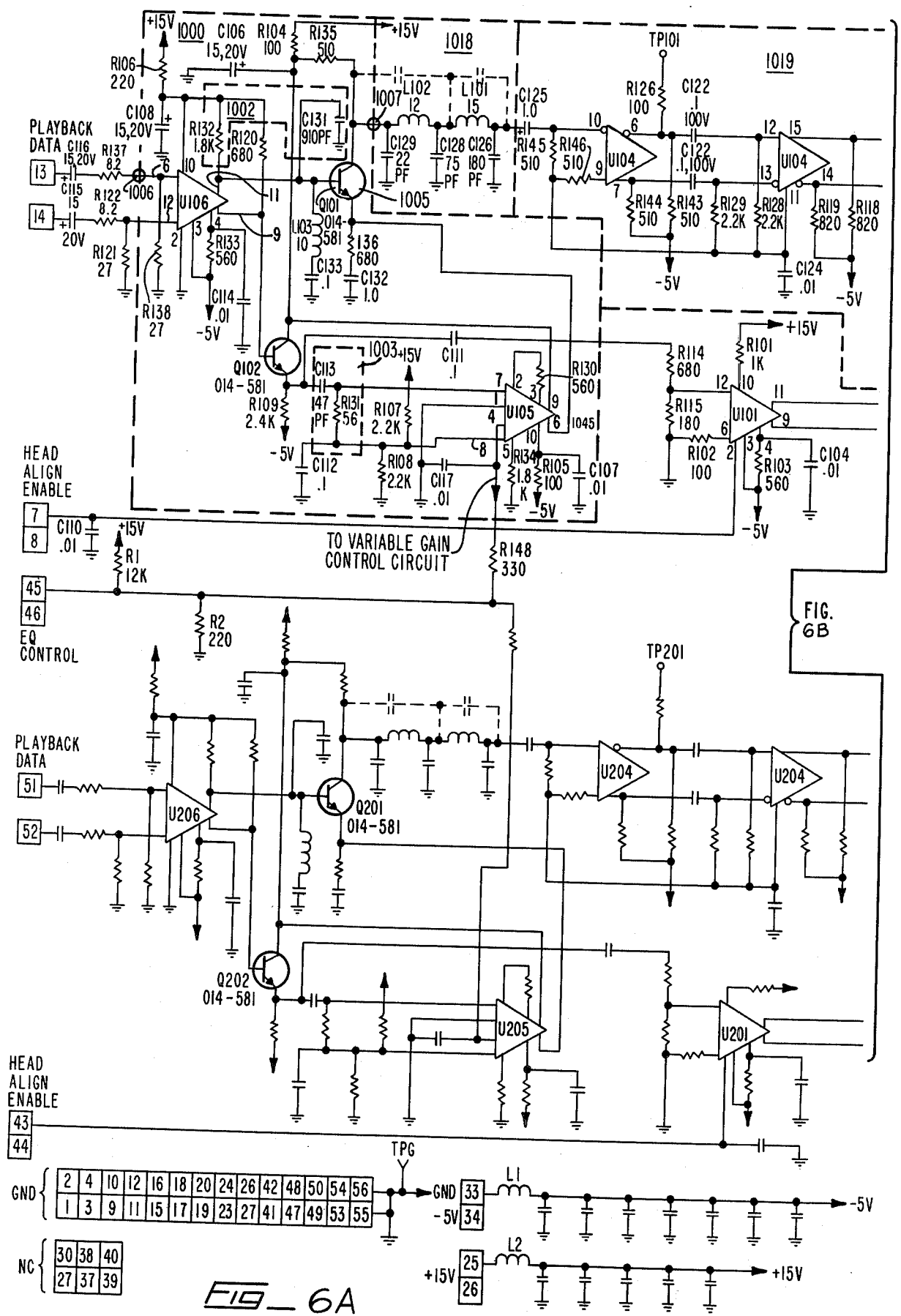
FIG_6A

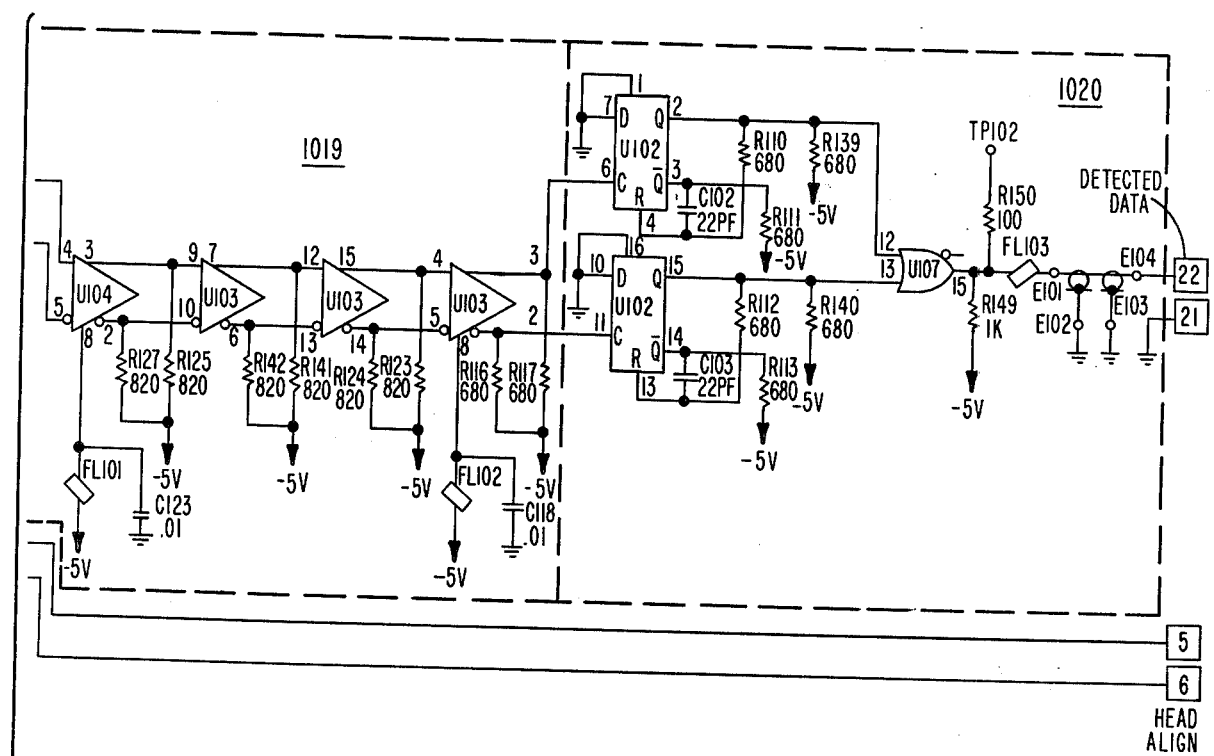
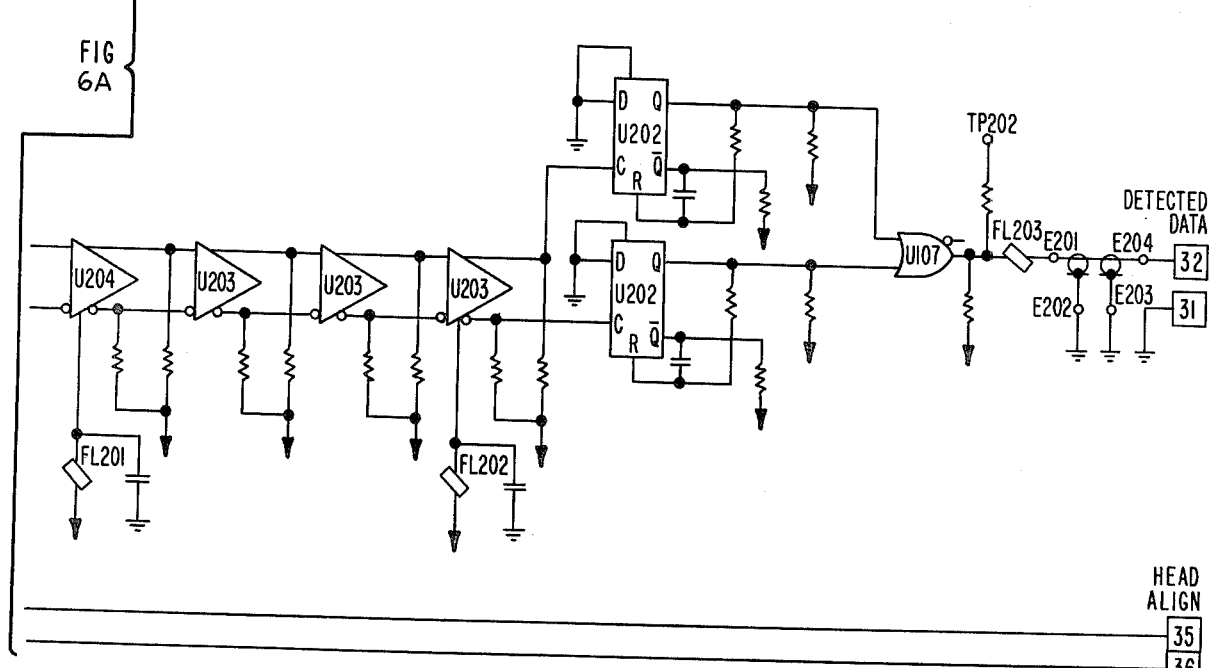
FIG_ 6B

FREQUENCY RESPONSE EQUALIZER

BACKGROUND OF THE INVENTION

The invention relates to a frequency response equalization circuit particularly suitable for magnetically recorded and reproduced signals where phase linearity over a wide frequency range is required.

Signals subjected to magnetic recording and reproducing process are generally distorted due to a non-constant amplitude response and non-linear phase response inherent to the process. Consequently, if an accurate replica of a magnetically recorded signal is to be reproduced, it is necessary to compensate for the signal distortion. A basic requirement for an ideal magnetic recording/reproducing channel is the ability to transmit signals of all frequencies without introducing amplitude changes dependent on frequency. A specific limitation of the magnetic recording/reproducing process is that signals of different frequencies are transmitted through the channel with different amounts of time delay due to the differentiating action of the reproduce head introducing a substantially 90° phase lead. Thus, when transmitting a complex waveform consisting of a number of sine wave components of different amplitudes and frequencies, the sine wave components are affected differently, thereby introducing unwanted signal distortion. To obtain an accurate reproduction of the originally recorded complex waveform, the various waveform components must be transmitted with an equal amount of time delay for all signal frequencies otherwise the resulting reproduced waveform would be seriously distorted. To achieve a constant time delay that is, of the same magnitude over the entire bandwidth of a recording/reproducing channel, the phase response of transmitted signals having different frequencies must change linearly with frequency.

There is known a number of prior art equalizers having cascaded passive and/or active elements, whose combined frequency responses yield an equalizing characteristic compensating for non-linearities causing signal distortions in a specific recording/reproducing channel. For example, for signal equalization over both low and high frequency range of a recording/reproducing channel, known prior art equalizers have several consecutive stages, such as high frequency passes and low frequency passes, usually followed by phase equalizers. These cascaded equalizers have a rather complex design.

In digital recording on a polarizable storage medium, such as magnetic or dielectric, where two levels of signals of opposite polarities are utilized to record signal bits, phase linearity within the entire bandwidth of the recording/reproducing channel is essential to permit reproduction of the originally recorded square waves with minimum overshoot and amplitude degradation. When utilizing a high bit density self-clocking recording system the need for both amplitude and phase equalization is even more pronounced. Due to the non-linear frequency response of the recording/reproducing channel, a recorded square wave signal when played back directly from a polarizable storage medium could be seriously attenuated and distorted to such extent that it would neither provide sufficient information about the originally recorded signal nor provide distinct zero crossovers necessary for an accurate self-clocking signal. Thus, amplitude as well as phase equalization is necessary to restore the reproduced signal to its original form.

SUMMARY OF THE INVENTION

Accordingly, it is an object of the present invention to provide a frequency response equalizer of a simple design, suitable for wideband magnetic recording and reproduction and compensating for both a non-constant amplitude response and non-linear phase response of a magnetic recording/reproducing channel.

It is another object of the present invention to provide a frequency response equalizer of a simple design which does not require utilization of a separate phase equalization circuit and which yields an overall constant amplitude and linear phase response for the entire frequency bandwidth of a magnetic recording/reproducing channel.

It is another object of the present invention to provide a frequency response equalizer of a simple design for use in a magnetic recording/reproducing channel to enable transmission of complex and transient waveforms therethrough eliminating amplitude and phase distortions thereof.

It is still another object of the present invention to provide a frequency response equalizer of a simple design which reduces pulse crowding and increases recording reliability of high density digital recording by compensating for amplitude changes with recording density of the high frequency signal while maintaining a linear phase response and amplitude boost in the high frequency signal range.

It is still a further object of the present invention to provide a frequency response equalizer of a simple design suitable for use in systems utilizing high density bit recording on a magnetic disc which equalizer provides a linear variable gain control of the differentiated signal path to compensate for amplitude losses due to pulse crowding on inner tracks of the magnetic disc, by linearly changing the boost of the high frequency portion of the amplitude response and by maintaining a linear phase response.

According to the present invention, a reproduce signal from a reproduce head is differentiated by a differentiating means and it is integrated by an integrating means. The differentiating means provides a differentiated signal having a substantial 90° phase lead with respect to the reproduce signal, while the integrating means provides an integrated signal having a substantial 90° phase lag with respect to the reproduce signal. A differential means provides a difference signal of the differentiated and integrated signals. The resulting difference signal is amplitude and phase-equalized with respect to the reproduce signal for all reproduce signal frequencies.

According to one embodiment of the present invention, a signal from a reproducing head and preamplifier combination is fed as an input signal to a parallel combination of an integrating and differentiating circuit. The integrating circuit provides an output signal having a phase lag of 90° while the differentiating circuit provides an output signal having a phase lead of 90° with respect to the input signal. A difference of the respective output signals is provided by a subtraction circuit. The signal at the output of the subtraction circuit is either in phase with respect to the originally recorded signal or inverted with respect thereto, depending on the particular polarities of the respective output signals from which the difference signal is obtained.

Because of the well known property of magnetic reproducing heads that the reproduced signal is a time differential of the recorded flux, the output voltage from the reproduce head and associated preamplifier circuit has a substantial 90° phase lead with respect to the phase of the magnetic flux recorded on the storage medium. Thus, the difference signal provided by the equalization circuit of the present invention has a constant phase shift of 0° or 180° that is, it is in phase or inverted with respect to the recorded magnetic flux depending on the direction of the 90° phase shift introduced by the equalizer. Consequently, the overall phase response of the resulting equalized frequency channel exhibits the required phase linearity over the entire frequency range of the channel.

Simultaneously with providing phase equalization, the frequency equalizer of the invention also provides amplitude equalization of the signal transmitted through the recording/reproducing channel. It is well known in the art that the amplitude response of a reproducing head follows a 6dB/octave rise which decreases at both low and high frequency ends of the amplitude characteristic due to various signal losses (refer to FIG. 4 of the drawings). The equalizer of the present invention compensates for the above-mentioned non-constant amplitude response and losses by providing a complementary frequency response as follows. The integrating circuit of the equalizer provides a low frequency boost at a rate of 6dB/octave while the differentiating circuit provides a high frequency boost at the same rate. By linearly subtracting the amplitude response of one of the circuits from the other one, a resulting characteristic (see diagram of FIG. 5) is obtained which, combined with the reproduce head characteristic (see diagram of FIG. 4), yields a resulting flat overall amplitude response throughout the entire frequency range of the channel.

Consequently, in the present invention there is no need to utilize separate equalizing circuits each providing amplitude or phase equalization, respectively. The frequency equalizer of the present invention is of a simple circuit design and at the same time provides both a constant amplitude and linear phase response of the record/reproduce channel over the entire frequency spectrum thereof.

BRIEF DESCRIPTION OF THE DRAWINGS

FIG. 1 is a block diagram of a reproducing circuit which includes the frequency response equalization circuit of the invention;

FIG. 2 is a block diagram including a preferred embodiment of the invention;

FIG. 3 is a block diagram including another preferred embodiment of the invention;

FIG. 4 is a graph showing the playback response of a conventional reproduce head and preamplifier combination circuit;

FIG. 5 is a graph showing an equalization characteristic provided by the frequency response equalization circuit of the invention which characteristic compensates for the playback response of FIG. 4; and FIGS. 6A and 6B are two consecutive parts of a detailed schematic electrical circuit diagram of still another preferred embodiment of the invention.

DESCRIPTION OF THE PREFERRED EMBODIMENTS

As an example, FIG. 1 shows a portion of a recording/reproducing channel, including a reproduce head 1008 coupled to a preamplifier 1009, the combination of elements 1008 and 1009 being designated as block 1001. The magnetic flux patterns recorded on a magnetic recording medium, such as tape, disc, drum, etc. (not shown) are picked-up by the reproduce head 1008 and amplified by the preamplifier 1009. Due to the differentiating action of the reproduce head, which is well known in the magnetic recording art, the output signal of block 1001 at terminal 1006 is a voltage proportional to the time-derivative of the recorded flux. Hence, the transfer function of block 1001 in the conventional symbolic notation of the Laplace transformation is $$G_1 \cong k_1 s \tag{1}$$

where
$G_1$ is a complex transfer function
$k_1$ is a gain constant, and
$s$ is the complex Laplace variable.

Note: With respect to the above-indicated symbolic notations $G$; $k$; $s$; these will be maintained throughout the specification while only the indexes thereof will be changed, indicating specific circuits to which the notations pertain. In the following equations symbolic notations R, C with indexes attached thereto indicate respective resistance and capacitance values pertaining to corresponding circuit elements indicated by identical notations and indexes in the specification and drawings.

To the output of block 1001 of FIG. 1 an equalization circuit 1000 of the present invention is coupled, the latter circuit being shown in an idealized form suitable for theoretical explanation of the equalization operation which follows. The equalization circuit 1000 has an input terminal 1006, to which the output signal of block 1001 is fed. To the input terminal 1006 inputs of an integrating circuit 1002 and a differentiating circuit 1003 are coupled, respectively. The transfer function of the integrating circuit is $$G_2 \cong k_2/s \tag{2}$$

and the transfer function of the differentiating circuit is
$$G_3 \cong k_3 s \tag{3}$$

In the differentiating signal path a variable gain control circuit 1004 is shown which enables to change linearly the high frequency boost effected by the differentiating circuit 1003, as it will be explained later in more detail. The difference of the respective output signals of the integrating and differentiating circuit is taken, as it is schematically shown by a subtraction circuit 1005. The resulting difference signal at output terminal 1007 of the equalization circuit 1000 is the required amplitude and phase-equalized signal with respect to the input signal at terminal 1006. The resulting recording/reproducing channel has an overall flat amplitude response and linear phase response for all transmitted signal frequencies, as it will follow from the more detailed description below.

The overall transfer function of the portion of the recording/reproducing channel shown in FIG. 1 comprising block 1001 and the equalization circuit 1000 coupled thereto is $$G_{overall} = G_1(G_2 - G_3) \qquad (4)$$

and after substituting for $G_1$, $G_2$ and $G_3$ from (1), (2) and (3)

$$G_{overall} = k_1 s (k_2/s - k_3 s) = k_1 k_2 (1 - [k_3/k_2]s^2) \qquad (5)$$

When substituting $s = jw$ we obtain $$G_{overall}(jw) = k_1 k_2 (1 + [k_3/k_2]w^2) \qquad (6)$$

The overall phase shift introduced by the portion of the recording/reproducing channel shown in FIG. 1 is determined by $$\text{phase of } G(jw) = \arctan \frac{Im\ G(jw)}{Re\ G(jw)} \qquad (7)$$

Since the expression on the right side of equation (6) is a real number (the imaginary part being zero), the overall phase shift determined by equation (7) is zero. At zero phase shift, the requirement of a linear phase response for all frequencies transmitted through the channel is satisfied.

It is essential for the invention to provide a difference signal at the output terminal 1007, rather than a sum of the respective output signals of the integrating and differentiating circuit. Each of the latter circuits introduces an equal phase shift of 90° but opposite in sense, lagging in the integrator and leading in the differentiator. Thus, the respective output signals of circuits 1002 and 1003 in FIG. 1 are out of phase by exactly 180° with respect to each-other and a difference signal yields a resulting signal combination, for which the respective signal amplitudes are added together, rather than subtracted from each other. Besides that, a −90° phase shift of the integrator output signal combined with the +90° phase shift of the differentiating action of the reproduce head yields an 0° overall phase shift. On the other hand, the +90° phase shift of the differentiator output signal combined with the +90° phase shift of the differentiating head yields a 180° overall phase shift which is simply an inversion. Whether the resulting overall phase shift of the record/reproduce channel is 0° or 180°, that is, whether the output signal at the terminal 1007 is in phase or inverted with respect to the polarity of the recorded flux, it depends on the sense of the 90° phase shift introduced by the equalizer 1000 as it will be described later in more detail.

Besides providing a linear phase response for all the frequencies transmitted through the channel, the equalizer circuit according to the invention also compensates for the non-constant amplitude-frequency response of the reproduce head, as it will be disclosed below. As it is well known in the art, the output voltage of the reproduce head 1008 and amplifier 1009 combination of FIG. 1 rises at low frequencies at a rate of 6dB/octave, levels off at mid-band frequencies and falls at high frequencies. Such an amplitude response is shown as an example at $G_R$ in FIG. 4. Consequently, if an overall flat amplitude response of the recording/reproducing channel is to be obtained, it is necessary for the equalizer to boost the amplitude at both low and high frequencies. This required equalizer characteristic is obtained by the circuit of FIG. 1 in a following manner. As an example, FIG. 5 shows a graph representing the gain $G_2$ of the integrating circuit 1002 and the gain $G_3$ of the differentiating circuit 1003 in dB, respectively, as dependent on frequency, the frequency values being plotted on a logarithmical scale. The characteristic $G_2$ falls and the characteristic $G_3$ rises with frequency at a rate of 6dB/octave. There are also shown diagrams of two other transfer functions $G_3'$ and $G_3''$ of the differentiating circuit, representing linear variation of these functions with variation of the gain control circuit 1004 output signal, as it will be described in more detail later. At $G_E$ a resulting transfer function of the equalization circuit 1000 is shown, obtained by adding the linear magnitudes $G_2$ and $G_3$. It can be seen that the transfer characteristic $G_E$ of the equalization circuit 1000 is complementary to the transfer characteristic $G_R$ of the reproduce head. Consequently, when combining the two characteristics $G_R$ and $G_E$, as it is provided by the circuit shown in FIG. 1, the equalizer characteristic $G_E$ compensates for the departures from flatness of the reproduce head characteristic $G_R$ both at low and high frequencies and an overall flat amplitude characteristic results.

There is an additional advantage provided by the equalization circuit according to the invention which allows linearly varying the amount of high frequency boost provided by the differentiating circuit. For this purpose a variable gain control circuit is utilized in the differentiating signal path, shown for example at 1004 in FIG. 1. By adjusting the gain of the differentiating signal path by means of circuit 1004, the frequency at which the high frequency boost of the equalizer amplitude response begins may be changed. For this purpose a variable resistor or potentiometer may be utilized or in case an amplifier is employed in the differentiating signal path, the gain of that amplifier may be changed in a well known manner, as it will be described in connection with the embodiment of FIG. 3. The group of curves $G_3$, $G_3'$, $G''_3$ shown in FIG. 5 is obtainable for three different values of gain provided by the differentiator 1003 in FIG. 1 and adjusted by the variable gain control circuit 1004. The gain adjustment affects only the gain constant $k_3$ in the transfer function (3) presented above and therefore, it changes only the corner frequency at which the high frequency boost begins, in accordance with the formula for the corner frequency $$w_c \cong \sqrt{\frac{k_2}{k_3}} \qquad (8)$$

As the corner frequency increases, the amount of signal amplitude boost decreases linearly as the curves obtained move from $G_3$ to $G'_3$ to $G''_3$, etc. Increasing the amplitude boost linearly at the high frequency end of the equalizer response is an important feature of the invention because it enables to compensate, for example, for changes in the relative head-to-recording medium speed, such as due to the variations in track length of a magnetic disc. When recording digital signals on magnetic disc, this feature of the invention allows to compensate for higher density of recorded bits, also called pulse crowding which occurs on the inner tracks of the disc.

Examples of practical implementation of the abovedescribed idealized form of the invention shown in FIG. 1 are shown in the form of block diagrams in FIGS. 2 and 3. Elements similar to those previously described and shown in FIG. 1 are designated in FIGS. 2 and 3 by the same reference characters as in FIG. 1.

With respect to the relatively low signal level at the output of playback amplifier 1009, it is necessary for practical purposes to amplify the signal at both the integrating signal path as well as in the differentiating signal path. Thus, in the diagram of FIG. 2 the integrating circuit of FIG. 1 is implemented by inverting integrating amplifier circuit 1002, comprising an inverting operational amplifier 1010, a negative feedback capacitor $C_1$ and a series input resistor $R_1$. On the other hand, the differentiating circuit of FIG. 2 is implemented by an inverting differentiating amplifier circuit 1003, comprising an inverting operational amplifier 1011, a negative feedback variable resistor $R_2$ and a series input capacitor $C_2$. The variable resistor $R_2$ represents a variable gain control for the differentiating signal path. The transfer function of the integrating amplifier circuit 1002 of FIG. 2 is:

$$G_2 \cong - \frac{1}{R_1 C_1 s} \tag{9}$$

When comparing equation (9) with (2) we obtain $$k_2 = - \frac{1}{R_1 C_1} \tag{10}$$

The transfer function of the differentiating amplifier circuit 1003 of FIG. 2 is $$G_3 \cong - R_2 C_2 s \tag{11}$$

When comparing equation (11) with (3) we obtain $$k_3 = - R_2 C_2 \tag{12}$$

The subtraction circuit of FIG. 1 is implemented in the circuit of FIG. 2 by a differential amplifier 1005. The output of the inverting integrating circuit 1002 is coupled to an inverting input of the differential amplifier 1005 while the output of the inverting differentiating circuit 1003 is coupled to a non-inverting input of amplifier 1005. The output signal at terminal 1007 is the difference signal which also represents the equalized signal of the recording/reproducing channel. The resulting equalized signal has 0° phase difference with respect to the signal recorded on the magnetic medium, that is, it is in phase therewith. Thus, the phase response of the overall channel becomes linear when the equalization circuit 1000 of the invention is utilized.

However, the circuit of FIG. 2 is still considered idealized to the extent that exact implementation of the above transfer functions (9) and (11) would require unlimited gain in the integrating amplifier circuit 1002 at low frequencies and in the differentiating amplifier circuit 1003 at high frequencies. In practical applications both these extremities are avoided, for example, by adding a shunt resistor $R''$ to $C_1$ and a series resistor $R'$ to $C_2$ as shown in FIG. 2, to truncate the respective integrating and differentiating approximations at selected frequencies below and above the frequency range of interest. Considering the presence of the respective resistors $R'$, $R''$ in the circuit of FIG. 2, the respective transfer functions $G_2$, $G_3$ will be $$G_2 \cong - \frac{k_2}{s + \frac{1}{R'' C_1}} \tag{13}$$

$$G_3 \cong - \frac{k_3}{R' C_2} \cdot \frac{s}{s + \frac{1}{R' C_2}} \tag{14}$$

where $R_1$, $R_2$, $R'$, $R''$, $C_1$ and $C_2$ are component values pertaining to corresponding circuit elements.

When considering in equation (13)

$$R'' C_1 s >> 1 \Longrightarrow s >> \frac{1}{R'' C_1} \tag{15}$$

We obtain $$G_2 \cong - \frac{k_2}{s} \tag{16}$$

which is identical to the transfer function of (2). When considering in equation (14)

$$R' C_2 s << 1 \Longrightarrow s << \frac{1}{R' C_2} \tag{17}$$

we obtain $$G_3 \cong - k_3 s \tag{18}$$

which is identical to the transfer function of (3).

It follows from the above discussion that when substituting for $s = jw$, the respective transfer functions of the integrating and differentiating circuit of the equalization circuit 1000 shown in FIG. 2 will approach that of an ideal integrator and differentiator in the frequency range $$\frac{1}{R'' C_1} << w << \frac{1}{R' C_2} \tag{19}$$

In FIG. 3 still another example of practical implementation of the present invention is shown. The integrating circuit of FIG. 1 is here implemented by a passive integrating network 1002 comprising series resistor $R_A$ and parallel capacitor $C_A$ followed by a non-inverting amplifier 1012 providing the necessary amplification in the integrating signal path. Analogously, the differentiating circuit of FIG. 1 is implemented in FIG. 3 by a passive differentiating network 1003 comprising a series capacitor $C_B$ and a parallel resistor $R_B$ followed by a non-inverting amplifier 1013 providing the necessary amplification in the differentiating signal path. Similarly as in the circuit of FIG. 2, the subtraction circuit is implemented by a differential amplifier 1005. In the circuit of FIG. 3 the integrated and subsequently amplified signal at the output of amplifier 1012 is fed to a non-inverting input of the differential amplifier 1005, while the differentiated and subsequently amplified signal at the output of amplifier 1013 is fed to an inverting input of amplifier 1005. The output signal at terminal 1007 of the circuit in FIG. 3 is the resulting difference signal which represents the equalized signal of the recording/reproducing channel. The resulting equalized signal has a 0° phase difference with respect to the signal recorded on the magnetic medium. Thus, the phase difference caused by the equalization circuit of the invention does not introduce non-linearities in the phase response of the overall channel, but to the contrary, it yields an overall linear phase response.

The respective transfer functions of the integrating and differentiating circuit of FIG. 3 are $$G_2 \cong A_2 \frac{\frac{1}{C_A s}}{R_A + \frac{1}{C_A s}} = \frac{A_2}{R_A C_A s + 1} \qquad (20)$$

$$G_3 \cong A_3 \frac{R_B}{R_B + \frac{1}{C_B s}} = \frac{A_3 R_B C_B s}{1 + R_B C_B s} \qquad (21)$$

where $A_2$ is the gain of amplifier 1012 and $A_3$ is the gain of amplifier 1013. When comparing equation (20) with (2) we obtain for $w >> (1/R_A C_A)$ $$k_2 = \frac{A_2}{R_A C_A} \qquad (22)$$

When comparing equation (21) with (3) we obtain for $w << (1/R_B C_B)$ $$k_3 = A_3 R_B C_B \qquad (23)$$

A potentiometer 1014 in FIG. 3 connected to the amplifier 1013 in the differentiated signal path represents a variable gain control circuit. By adjusting the gain $A_3$ of amplifier 1013, the gain constant $k_3$ expressed by (23) and the corner frequency of the boost changes as it has been described above in connection with the description of FIG. 5 and equation (8).

To provide a more complete disclosure of the present invention, a detailed electrical circuit diagram of a preferred embodiment thereof is shown in consecutive FIGS. 6A and 6B and will be now described. The circuit of FIGS. 6A and 6B is utilized in a playback equalizer and data detector of a video frame storage recording and reproducing system manufactured by Ampex Corporation, assignor of the present patent application. In that system a color television signal is encoded in digital form utilizing the Miller Square Code and recorded on a magnetic disc. At playback, the digital data is reproduced by a reproduce head and amplified by a reproduce preamplifier (reproduce head and preamplifier are not shown in FIGS. 6A and 6B). Since FIGS. 6A and 6B show two identical playback equalizer and data detector circuits utilized for separate but identical playback channels, only one of these circuits will be described. In the circuit of FIGS. 6A and 6B the preamplified playback data is equalized by an equalization circuit 1000 designed according to the present invention. The equalized signal is filtered in a low pass filter circuit 1018, and thereafter amplified and amplitude limited to produce a rectangular pulse sequence in an amplifier-limited circuit 1019. The pulse sequence from the limiter is fed through a pulse former circuit 1020 which forms output pulses for each detected signal transition. The pulses from circuit 1020 are fed to a Miller Square Decoder (not shown) which decodes the playback data to obtain the original color television signal.

As shown in FIGS. 6A and 6B, the playback data from the preamplifier is applied to differential input terminals 6 and 12 of a differential amplifier U106, such as manufactured by RCA, type CA 3004. This type of amplifier contains open-collector differential output transistors connected to output terminals 9 and 11. Resistor R120 is the load resistor for the non-inverting output terminal 9. The gain of the amplifier U106 to output terminal 9 is constant throughout the frequency range of interest. The non-inverted signal is buffered by emitter follower Q102 and then applied to a differentiating network 1003 comprising capacitor C113 and resistor R131. This network 1003 performs differentiation for signal frequencies below 60 MHz. Its transfer function is $$G_3 \cong \frac{(R131)(C113) s}{1 + (R131)(C113) s} \qquad (22)$$

and for $w < \frac{1}{(R131)(C113)}$ $$G_3 \cong (R131)(C113) s \qquad (23)$$

Equation (23) corresponds to previously discussed equation (3) related to the block diagram of FIG. 1 where $k_3 = (R131)(C113)$. Since signals of interest in this particular embodiment extend only to about 10 MHz, this network 1003 may be viewed as a true differentiator. The output of the differentiator 1003 is applied to input terminal 7 of differential amplifier-multiplier circuit U105, such as manufactured by Motorola, type MC1496. Input terminals 7 and 8 of U105 are differential input terminals biased by connection to +7.5V. The amplifier-multiplier U105 receives a second input signal at differential input terminals 4 and 1 and at output terminal 6 an output current is provided proportional to the negative of the product of the input signals at terminals 7, 8 and 4, 1. In the present circuit a direct current gain control voltage is applied to input terminal 4, while terminal 1 is grounded. The control voltage at 4 corresponds to an output voltage from a remote variable gain control circuit (not shown), such as previously described in connection with circuit 1014 of FIG. 3. In the presently described preferred embodiment of the invention the gain of the circuit U105 in the differentiated signal path is remotely and automatically controlled by a digital-to-analog converter to obtain desired gain variations dependent on the variations of the recording track length of the magnetic disc. A particular track number (corresponding to a specific track length) from which a particular data is being reproduced is decoded in a digital decoder and converted in the digital-analog converter to a direct current voltage level which is then applied as a gain control signal to input terminal 4 of circuit U105. As it has been mentioned before, the variable gain adjustment in the differentiated signal path is designed to compensate for higher pulse density on inner tracks of the disc while linearity of the high frequency boost of the equalized signal is maintained for the entire frequency band transmitted.

The magnitude of the current at output terminal 6 of the amplifier-multiplier circuit U105 is proportional to the input signal at input terminal 7 and to the gain value determined by the control voltage at terminal 4. The output current from terminal 6 of U105 is applied as an input current to the emitter of a common-base transistor amplifier Q101. This latter transistor corresponds to the subtraction circuit 1005 which has been previously described and shown in FIGS. 1, 2 and 3. This input current produces an output voltage at the collector of Q101 which is proportional to both the input current and resistance of a collector load resistor R135 of Q101. Thus, the above-indicated part of the transistor Q101 output voltage is proportional to the negative of the signal derivative amplified by the amplifier-multiplier circuit U105.

The inverting output terminal 11 of the differential amplifier U106 has a load resistor R132 and a parallel load capacitor C131. The direct current gain of the amplifier U106 to output terminal 11 is higher than the gain to the non-inverting output terminal 9 by the ratio of the respective load resistances R132/R120, that is, by the factor of about 3. For signal frequencies above 80 KHz the gain to output terminal 11 is determined by C131 and is inversely proportional to the frequency. Thus, the output circuit R132, C131, connected to terminal 11 functions as an integrating network for frequencies above 80 KHz and throughout the frequency range of interest which is approximately from 0.3 MHz to 10 MHz. The transfer function of the amplifier U106 to the output terminal 11 is $$G_{106} = -3A_{106} \frac{1}{(R132)(C131)s + 1} \quad (24)$$

where $A_{106}$ is the gain of the differential amplifier U106 to output terminal 9.

$$\text{For } w > \frac{1}{(R132)(C131)} \quad (25)$$
$$G_{106} \cong -3A_{106} \frac{1}{(R132)(C131)s}$$

Equation (25) corresponds to previously discussed equation (2) related to the block diagram of FIG. 1, where $$k_2 = \frac{-3A_{106}}{(R132)(C131)}.$$

The inverted and subsequently integrated signal from the output terminal 11 of amplifier U106 is applied to the common emitter transistor amplifier Q101. Transistor Q101 inverts this input signal and multiplies it by the ratio of its respective collector and emitter load resistances R135/R136. The transistor Q101 operates as a common emitter amplifier in the integrating signal path and as a common base amplifier in the differentiating signal path. The resulting output signal at the collector of transistor Q101 is the sum of two input signal contributions, one proportional to the integral of the playback signal from the reproduce head and preamplifier combination, the other one proportional to the negative of the derivative of the playback signal. Thus, the resulting output signal at the collector of transistor Q101 corresponds to a difference signal, such as previously described with reference to the output signal at the output terminal 1007 of the previously described preferred embodiments of the invention shown in FIGS. 1, 2 and 3. Thus, the output signal of the equalization circuit 1000 of FIG. 6. corresponds to the equalized signal of the recording/reproducing channel as previously disclosed with respect to the embodiments of FIGS. 1, 2 and 3.

Now the remaining part of the detailed circuit diagram of the preferred embodiment of the invention shown in FIG. 6 will be described for completeness. The equalized output signal from the collector of transistor Q101 is filtered by a low pass filter circuit 1018 and thereafter fed through a first buffer amplifier U104, such as type MC10116P, of an amplifier-limiter circuit 1019. The output signal from the buffer amplifier is fed through a series of five amplitude-limiting amplifiers, preferably of the same type as the buffer amplifier. The reason for amplitude-limiting the playback signal is to restore the required rectangular shape of the playback data which has been considerably distorted by the reproducing and equalization processes. The circuit 1019 provides two output signals. First, a rectangular pulse sequence of non-inverted polarity is provided at the output terminal 3 of the last amplifier U103 of the series of amplitude-limiting amplifiers and second, an identical pulse sequence of inverted polarity is provided at the output terminal 2 of the same amplifier U103. Both these pulse sequences are applied respectively to two identical one-shot multivibrators U102, such as type MC10131L of the pulse former circuit 1020. Each multivibrator forms a positive or negative pulse, respectively, for each positive or negative going transition of its respective input pulse. The output pulses of both multivibrators are applied to separate inputs of a positive OR-gate U107 which forms an output pulse for each input pulse regardless to its polarity. The output pulses of the OR-gate U107 are applied to data decoder (not shown) for decoding of playback data from which the original color television signal is obtained.

Utilization of the invention disclosed in the foregoing specification is particularly advantageous for high bit density digital recording on magnetic disc, including the feature of compensating for changes in recording density and thus for pulse crowding on the inner tracks of the disc surface, while maintaining both linear phase and constant amplitude response. Also, there is an additional advantage of the present invention particularly for digital recording, in converting voltage peaks of the output signal of the preamplifier which represent zero crossings of the originally recorded flux, back into zero crossings of the output signal of the equalizer. However, the use of the frequency equalizer of the invention is by no means limited to digital and/or disc recording. It may be utilized for any type of magnetic recording including analog signal recording such as for video, instrumentation, audio, etc., purposes. It has been found experimentally that by utilizing the embodiment shown in FIGS. 6A and 6B, very good equalization results are achieved up to the region of moderately short wavelengths, for example, to cca 300 microinches wavelength on a disc recorder with 35 microinches of head-to-disc separation and to cca 100 microinches wavelength for in-contact tape recording.

Various modifications of the disclosed embodiments, as well as alternate embodiments, may become apparent to those skilled in the art without departing from the scope and spirit of the invention as defined by the appended claims.

What is claimed is:

1. A frequency response equalization circuit in an apparatus having a circuit for axis crossing detection of signals transmitted through a digital magnetic recording/reproducing channel, said channel having a non-constant amplitude response and a non-linear phase response, where the signal provided by a magnetic reproduce head is a time differential of the recorded flux, comprising:

a parallel combination of a low-pass integrating circuit and of a high-pass differentiating circuit, both said circuits having inputs coupled to an output of said magnetic reproduce head, each said circuit having respective outputs providing output signals having respective phase shifts of substantially 90°, equal in magnitude and opposite in sense with respect to said signal provided by said reproduce head;

a first means having respective inputs coupled to respective outputs of said integrating circuit and differentiating circuit, said first means providing a difference signal of said respective output signals, said difference signal being amplitude and phase equalized with respect to said signal provided by said reproduce head, the resulting equalized channel having a constant amplitude response and a linear phase response for all signal frequencies transmitted therethrough; and a second means for coupling the difference signal provided by said first means to an input of said circuit for axis crossing detection.

2. The equalization circuit of claim 1, further comprising a gain adjustment circuit coupled to said differentiating circuit to provide a linear variation of a high frequency amplitude boost effected by said differentiating circuit with frequency while maintaining an unchanged low frequency amplitude boost effected by said integrating circuit.

3. The equalization circuit of claim 1, wherein:

the low pass integrating circuit comprises a first inverting operational amplifier, a negative feedback capacitor, and a series input resistor;

the high pass differentiating circuit comprises a second inverting operational amplifier, a negative feedback resistor, and a series input capacitor, said first and second amplifier having their respective inverting inputs coupled to receive said reproduce signal; and the first means providing a difference signal comprises a differential amplifier having its inputs coupled to respective outputs of said first and second operational amplifier.

4. The equalization circuit of claim 3 wherein said negative feedback resistor of said second inverting operational amplifier is a variable resistor for adjusting the gain provided by differentiating circuit.

5. The equalization circuit of claim 3 further comprising:

a shunt resistor connected to said negative feedback capacitor and a series resistor connected to said series input capacitor to limit respective integrating and differentiating operations by said respective integrating and differentiating circuit outside a frequency range of interest.

6. The equalization circuit of claim 1, further comprising:

a first and a second non-inverting amplifier and wherein the low-pass integrating circuit comprises a passive integrating network having a series resistor and a parallel capacitor, said network coupled to an input of said first non-inverting amplifier;

the high pass differentiating circuit comprises a passive differentiating network having a series capacitor and a parallel resistor, said network coupled to an input of said second non-inverting amplifier; and said means providing a difference signal comprises a differential amplifier having its inputs coupled to respective outputs of said first and second non-inverting amplifier.

7. The equalizer of claim 6 further comprising a variable gain control circuit for adjusting the gain of said second non-inverting amplifier to provide a linear variation of a high frequency amplitude boost effected by said differentiating circuit with frequency.

8. A frequency response equalization circuit for a magnetic transducer employed for reproducing a signal recorded on a magnetic medium, the reproduced signal being a time differential of the recorded magnetic flux, and exhibiting amplitude and phase distortions caused by a non-constant amplitude response and non-linear phase response of the transducer, comprising:

first means coupled to said transducer for providing a high frequency amplitude boost to the reproduced signal with a substantial 90° phase lead;

second means coupled to said transducer for producing a low frequency amplitude boost to the reproduced signal with a substantial 90° phase lag;

said low frequency amplitude boost provided by said second means compensating for a rising portion of a non-constant amplitude response of said transducer;

said high frequency amplitude boost provided by said first means compensating for a falling portion of a non-constant amplitude response of said transducer;

third means coupled to said first means for linearly controlling the gain of said first means to provide a linear variation with frequency of said high frequency amplitude boost provided by said first means while maintaining said low frequency amplitude boost provided by said second means unchanged and;

fourth means coupled to respective outputs of said first and second means and providing a difference signal of respective output signals of said first and second means, said difference signal being amplitude and phase equalized with respect to said reproduced signal, said circuit providing a resulting constant amplitude response and linear phase response for all reproduced signal frequencies.

* * * * *